United States Patent

Strawczynski et al.

[11] Patent Number: 6,138,022
[45] Date of Patent: *Oct. 24, 2000

[54] CELLULAR COMMUNICATION NETWORK WITH VOCODER SHARING FEATURE

[75] Inventors: Leo Strawczynski, Ottawa; Bill W. A. Gage, Stittsville; Rafi Rabipour, Côte St. Luc, all of Canada

[73] Assignee: Nortel Networks Corporation, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/898,867

[22] Filed: Jul. 23, 1997

[51] Int. Cl.[7] .............................. H04Q 7/20; H04B 1/38; H04M 1/00; G01R 31/08
[52] U.S. Cl. .......................... 455/445; 455/422; 455/560; 370/238
[58] Field of Search ..................... 455/445, 422, 455/436, 67.4, 11.1, 561, 560; 375/242; 370/238

[56] References Cited

U.S. PATENT DOCUMENTS

| | | | |
|---|---|---|---|
| 4,890,327 | 12/1989 | Bertrand et al. | 704/219 |
| 5,422,935 | 6/1995 | Spear | 455/445 |
| 5,440,615 | 8/1995 | Caccuro et al. | 379/88.06 |
| 5,513,172 | 4/1996 | Shikama et al. | 370/428 |
| 5,608,779 | 3/1997 | Lev et al. | 455/436 |
| 5,666,348 | 9/1997 | Thornberg et al. | 370/230 |
| 5,729,536 | 3/1998 | Doshi et al. | 370/398 |
| 5,784,406 | 7/1998 | DeJaco et al. | 455/67.4 |
| 5,793,810 | 8/1998 | Han et al. | 455/422 |
| 5,825,760 | 10/1998 | Siira | 370/331 |

FOREIGN PATENT DOCUMENTS

96/19907  6/1996  WIPO.

*Primary Examiner*—Dwayne D. Bost
*Assistant Examiner*—Raymond B. Persino

[57] ABSTRACT

The present invention provides a novel system and a method for improving the voice quality of wireless-to-wireless calls or wireless-to-fixed terminal calls, while permitting a more efficient utilization of network resources. In a first aspect, the invention provides a communication system including a plurality of base stations connected to one another through a digital network (such as TDM, frame relay or ATM). Also, a plurality of vocoder channels, separate from the individual base stations, provide a data flow path from the base stations to wireline terminals first through the digital network via a Mobile Switching Center and finally through a landline network. In a wireless-to-wireless call, the compressed audio signal travels from one base station to another without undergoing any de-compression/compression. This avoids undesirable vocoder tandeming known to degrade voice quality. If the call is identified as being of a wireless-to-wireline terminal nature, the data is directed to a vocoder channel for decompression into PCM samples. The samples are then transmitted to the fixed terminal through the landline network. The main advantage of this network architecture is that fewer vocoders are required by comparison to prior art systems, therefore fewer costs are incurred. In addition, voice quality is improved.

17 Claims, 3 Drawing Sheets

CELLULAR COMMUNICATION NETWORK WITH VOCODER SHARING FEATURE

FIELD OF THE INVENTION

The invention relates to digital signal processing in a digital cellular network and more particularly to a communication system featuring one or more vocoder channels functionally separate from the base stations. The vocoder channel is bypassed in the case of wireless-to-wireless calls, thus avoiding vocoder tandeming that can degrade the voice quality of the connection. In the case of a wireless-to-fixed terminal call the data flow is directed through the vocoder channel for de-compression and transported to the fixed terminal through a landline network, such as a PSTN, ISDN or Internet network.

BACKGROUND OF THE INVENTION

In recent years, the telecommunications industry has witnessed the proliferation of a variety of digital vocoders in order to meet bandwidth demands of different wireline and wireless communication systems. The name <<vocoder>> stems from the fact that its applications are specific to the encoding and decoding of voice signals primarily. A vocoder therefore is comprised of an encoder stage and a decoder stage. Vocoders are usually integrated in mobile telephones and the base stations of the communication network. They provide compression of a digitized voice signal as well as the reverse transformation. Typically, a voice signal is digitized through one of many quantization techniques. Examples of these techniques are Pulse Code Modulation (PCM) and Delta Modulation. For the purposes of this description we will refer to PCM as the input format for the vocoder. Thus a vocoder includes an encoder stage that will accept as input a digitized voice signal and output a compressed signal, the typically compression ratio being in the order of 8:1 to 12:1. As for the reverse transformation the vocoder is provided with a decoder stage that will accept the compressed speech signal and output a digitized signal, such as PCM samples.

The main advantage of compressing speech is that it uses less of the limited channel bandwidth for transmission. The main disadvantage is loss of speech quality.

The rapid growth in the diversity of networks and the number of users of such networks is increasing the number of instances where two vocoders are placed in tandem to serve a single connection. Tandem connections of low bit-rate codecs are known to cause additional distortions and reduce the quality of the speech signal. One example of such a scenario in a wireless context is a wireless-to-wireless link.

In such a case, a first encoder is used to compress the speech of the first wireless user. The compressed speech is transmitted to a base station serving the local wireless terminal and it is then decompressed (converted to PCM format samples) by a vocoder. The resulting PCM samples arrive at the base station serving the second wireless terminal, over the digital trunk of the telephone network, after being compressed by a second encoder. The speech signal is then ready for transmission to the second wireless terminal. A speech decoder at the speech wireless terminal decompresses the received compressed speech data to synthesize the original speech signal from the first wireless terminal.

In an attempt to eliminated the condition of vocoder tandeming, a method called <<bypass>> has been proposed in the past. The basic idea behind this approach is the provision of digital signal processors including a vocoder and a bypass mechanism that is invoked when the incoming signal is in a format compatible with the vocoder. In use, the digital signal processor associated with the first base station that receives the RF signal from a first wireless terminal determines, through signaling and control that a compatible digital signal processor exists at the second base station associated with the wireless terminal at which the call is directed. The digital signal processor associated with the first base station, rather than converting the compressed speech signals into PCM samples, invokes the bypass mechanism and outputs the compressed speech to the transport network. The compressed speech signal, when arriving at the digital signal processor associated with the second base station, is routed such as to bypass the local vocoder. Decompression of the signal occurs only at the second wireless terminal. The "bypass" approach is described in the international application serial number PCT/CA95/00704 dated Dec. 13, 1995. The contents of this disclosure are incorporated herein by reference.

Although this solution is effective in reducing vocoder tandeming, it still requires a dedicated vocoder per base station. This vocoder deployment strategy is not particularly effective because the vocoder units are not utilized in the most efficient manner. More specifically, when a call is made, the system determines whether the vocoder should be enabled or the bypass mechanism should be invoked. This is not an optimal utilization of network resources since the vocoder functionality, or the bypass functionality of the base station, are alternative elements and if one is invoked during a given call, the other remains idle.

OBJECTS AND STATEMENT OF THE INVENTION

An object of the invention is to provide a cellular communication network configured to reduce the likelihood of vocoder tandeming in the course of a call.

Another object of the invention is to provide a method for call routing in a cellular communication network to reduce the likelihood of vocoder tandeming in the course of a wireless-to-wireless call.

As embodied and broadly described herein, the invention provides a communication network, comprising:

a) a group of base stations, each base station being capable to establish an RF communication with a wireless terminal over an air interface, each base station being capable of exchanging with a respective wireless terminal data packets of compressed audio information, each data packet including a coefficients segment and a excitation segment;

b) a digital network interconnecting said base stations to one another, said digital network establishing a pathway to allow a given base station to exchange data packets of compressed audio information with another base station of said group;

c) a branch connected to said digital network to establish a pathway from said digital network toward a landline network, said branch including a decoder capable of decoding a data packet of compressed audio information directed through said branch;

d) a control system to control routing of a data packet of compressed audio information received at one of said base stations from an associated wireless terminal, said control system capable of selectively directing the data packet of compressed audio information toward either one of said one base station, a base station other than said one base station and said branch, in dependence upon the destination of the data packet of compressed audio information.

In this specification, the term "wireless terminal" is intended to include both mobile terminals and fixed wireless terminals.

The term "Base station" in a wireless communication network is meant to designate a fixed station enabling, through radio communications with wireless terminals, a link between the wireless terminals and the "backbone" network (also called landline network) through radio communication with wireless terminals Base stations are located at the center or on the edge of a coverage region (cell) and may include, among others, a base transceiver station (BTS), a base station controller (BSC), antennas, etc.

The expression "data packet" will refer to a group of bits organized in a certain structure that conveys some information. Typically, a data packet when representing a sample of compressed audio information will usually include a user segment (containing the speech information), a signaling and control segment, an address segment, a header and a trailer segment, etc. The expression "Compressed audio information" is limited to include a "Coefficients segment" and an "Excitation segment".

The term "Coefficients segment" is intended to refer to any set of coefficients that uniquely defines a filter function that models the human articulatory tract. In conventional vocoders, several different types of coefficients are known, including reflection coefficients, arcsines of the reflection coefficients, line spectrum pairs, log area ratios, among others. These different types of coefficients are usually related by mathematical transformations and have different properties that suit them to different application. Thus, the term "Coefficients segment" is intended to encompass any of these types of coefficients.

The "excitation segment" can be defined as information that needs to be combined with the coefficients in order to provide a representation of the audio signal in a non-compressed form. Such excitation segment may include parametric information describing the periodicity of the speech signal, an excitation signal as computed by the pseudo-decoder, speech framing control information to ensure synchronous framing in the pseudo-encoder associated with the remote vocoder, pitch periods, pitch lags, gains and relative gains, among others. The coefficients segment and the excitation segment can be represented in various ways in the signal transmitted through the network of the telephone company. One possibility is to transmit the information as such, in other words a sequence of bits that represents the values of the parameters to be communicated. Another possibility is to transmit a list of indices that do not convey by themselves the parameters of the common format signal, but simply constitute entries in a database or codebook allowing the pseudo-encoder to look-up this database and extract on the basis of the various indices received the pertinent information to construct the common format signal.

In a preferred embodiment, the present invention provides a novel cellular Communications Network including a plurality of base stations that are connected to one another through a digital network, such that a data packet of a compressed audio signal received at one base station can be transmitted over the digital network toward another base station. This mode of data exchange is suitable for wireless-to-wireless calls.

One or more branches connect the digital network to the landline network to allow establishment of wireless-to-wireline terminal calls. Each one of these branches incorporates a vocoder whose function is to decode (decompress) the data packet issued by a base station. The resulting signal is usually PCM samples that are then transported through the landline network toward the central office to which the fixed terminal is connected. At the central office the PCM samples are converted to analog format and conveyed to the handset of the subscriber. In the Integrated Services Digital Network (ISDN) though, the PCM signals are sent to the end user in a digital format.

The path thus followed by the data packet is dependent upon its final destination. For wireless-to-wireless calls, the data packets remain in the digital network interconnecting the various base stations of the network. As such, no vocoder tandeming can occur since the vocoder functions are now separate from the base stations. As a result, the usual degradation in the quality of speech observed to arise when vocoders are serially connected when a call is established can be avoided.

Another important advantage that results from this novel network architecture is the possibility of reducing the number of vocoders required in the network. Prior art network configurations are designed such as to incorporate a vocoder function in every wireless-to-wireless telecommunication. Those vocoders are useful when wireless-to-wireline terminal calls are made, and serve the purpose of converting the data packet into PCM samples. However, during wireless-to-wireless calls, the vocoders serve no beneficial function, rather they can be detrimental in that the vocoders can establish tandemed connections known to degrade the quality of the speech.

The routing of the data packet, in other words whether the packet will remain in the digital network or move through the vocoder branch, is effected through the existing signaling and control mechanisms and protocols in the network. As it is well known to those skilled in the art, the data packets carry signaling and control bits that in conjunction with external control channels direct the packet towards the correct destination. Thus, on the basis of the telephone number dialed by the subscriber at the wireless terminal, the system can determine where and how to route the packet. If the packet is directed to a wireline terminal, then, through switching, it is directed to a vocoder branch. Otherwise, the packet remains in the digital network.

It should be pointed out that the transport of the data packet through the digital network connecting the various base station can be effected without any transformations on the packet as long as the vocoders in the respective wireless terminals associated with the various base stations are compatible with one another.

As embodied and broadly described herein, the invention further provides a communication network for exchanging audio information between a wireless terminal and either one of a wireless terminal and a wireline terminal, the wireline terminal being accessible through a landline network, said communication network including:

a) a group of base stations, each base station being capable to establish an RF communication with a wireless terminal over an air interface, each base station being capable of exchanging with a respective wireless terminal data packets of compressed audio information, each data packet including a coefficients segment and a excitation segment;

b) a digital network interconnecting said base stations to one another, said digital network establishing a pathway to allow a given base station to exchange data packets of compressed audio information with another base station of said group, said base stations and said digital network defining a sub-network for transporting primarily data packets of compressed audio information;

c) a data communication channel including a first end and a second end, said first end being connected to said sub-network, and said second end being capable of being connected to the landline network, d) a decoder in said data communication channel between said first end and said second end, said decoder being capable of decompressing a data packet of compressed audio information that is received from a base station.

As embodied and broadly described herein, the invention further provides a communication network for exchanging audio information between a wireless terminal and either one of a wireless terminal and a wireline terminal, the wireline terminal being accessible through a landline network, said communication network including:

a) a first base station capable to establish an RF communication with a first wireless terminal over an air interface, said first base station being capable of exchanging with said first wireless terminal data packets of compressed audio information, each data packet including a coefficients segment and a excitation segment;

b) a second base station capable to establish an RF communication with a second wireless terminal over an air interface, said second base station being capable of exchanging with said second wireless terminal data packets of compressed audio information, each data packet including a coefficients segment and a excitation segment;

c) a digital network connecting said first base station to said second base station to allow data exchange therebetween, said digital network and said base stations constituting a pathway permitting transfer of a data packet of compressed audio information received from said first base station toward said second base station substantially without any decoding, d) a data communication channel including a first end and a second end, said first end being connected to said pathway, and said second end being capable of being connected to the landline network, e) a decoder in said data communication channel between said first end and said second end, said decoder being capable of decompressing a data packet of compressed audio information that is received from a base station.

As embodied and broadly described herein, the invention further provides a method for transporting audio information received from a first wireless terminal, including the steps of:

a) providing a communication network that includes:
1) a first base station capable to establish an RF communication with the first wireless terminal over an air interface, said first base station being capable of exchanging with the first wireless terminal data packets of compressed audio information, each data packet including a coefficients segment and a excitation segment;
2) a second base station capable to establish an RF communication with a second wireless terminal over an air interface, said second base station being capable of exchanging with the second wireless terminal data packets of compressed audio information, each data packet including a coefficients segment and a excitation segment;
3) a digital network connecting said first base station to said second base station to allow data exchange therebetween, said digital network and said base stations constituting a pathway permitting transfer of a data packet of compressed audio information received from said first base station toward said second base station substantially without any decoding,
4) a data communication channel including a first end and a second end, said first end being connected to said pathway, and said second end being capable of being connected to the landline network,
5) a decoder in said data communication channel between said first end and said second end, said decoder being capable of decompressing a data packet of compressed audio information that is received from a base station, b) determining a destination of a call initiated from the first wireless terminal;
1) if said call is directed toward the second wireless terminal associated with said second base station, directing data packets of compressed audio signal received from the first wireless terminal associated with said first base station through said digital network,
2) if said call is directed toward a second wireless terminal associated with said first base station, directing data packets of compressed audio signal received from the first wireless terminal associated with said first base station directly to second wireless terminal,
3) if said call is directed toward a wireline terminal connected to the landline network, directing data packets of compressed audio signal received from the wireless terminal associated with said first base station through said data communication channel.

DESCRIPTION OF A PREFERRED EMBODIMENT

Figure 1:
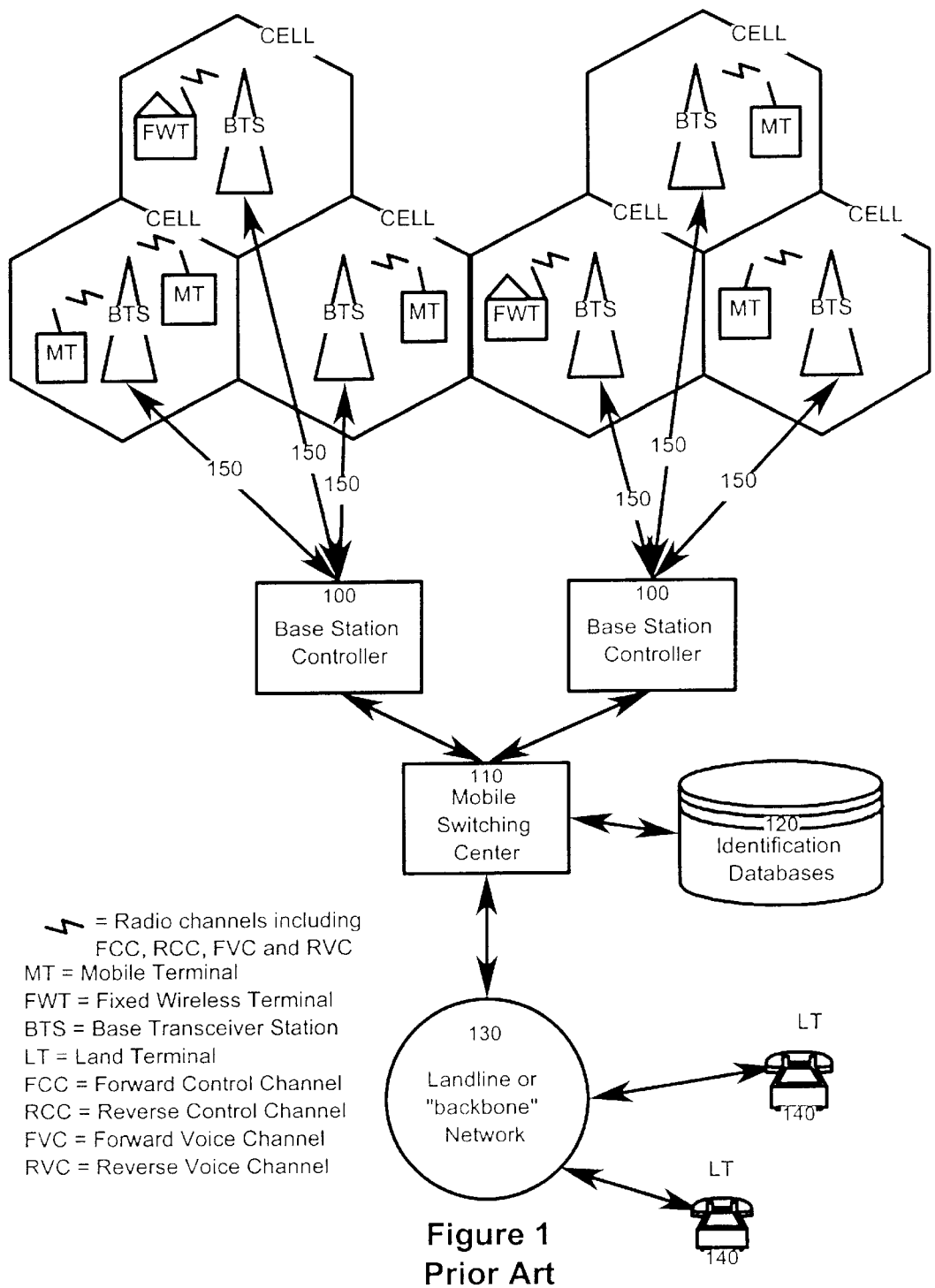
FIG. 1 is a block diagram representation of a partial cellular wireless telecommunications network.

FIG. 1 is a block diagram representation of a portion of a cellular wireless telecommunications network. In this figure, Mobile terminals (MT) are on the move in the hexagonal areas defined as cells. Fixed wireless terminals (FWT) are also included in the areas defined as cells. Each cell covers a predetermined geographical area and has a Base Transceiver Station (BTS) which communicates through radio channels with the MTs and FWTs. Typically, these channels are in the 900 MHz, 1.8 GHz or 1.9 GHz ranges. A number of these BTSs (i.e. cells) may be connected by land line or microwave link 150 to one Base Station Controller 100 (BSC), which controls handoff functions and routes the signal as requested. A number of BSCs are in turn connected to a Mobile Switching Center 110 (MSC). The MSC coordinates the activities of all its BSCs, verifies/acknowledges MT information through its identification database 120 and provides a connection to the landline network 130. The landline network may include, among others, the Public Switched Telephone Network (PSTN), the Integrated Services Digital Network and the Internet. Land terminals 140

(LT) are also known for completeness. Note that the landline network and LTs are not part of the cellular wireless communication network.

When a call is made to or from a wireless terminal (MT or FWT), four radio channels are involved in each of the links between a wireless terminal and a BTS. The channel used to communicate voice data from the BSC to the wireless terminal is called Forward Voice Channel (FVC). The channel used to communicate voice data from the wireless terminal to the BSC is called the Reverse Voice Channel (RVC). Two other channels carry the handshaking information required to establish communications with wireless terminals. They are the Forward Control Channel (FCC) and the Reverse Control Channel (RCC). Among other things, the FCC and RCC are used to broadcast the mobile identification number (MIN) (i.e. the wireless terminal's phone number). Transmission power in the MTs and BTS is monitored and controlled, and when MTs move from one cell to another, a switching technique called handoff is initiated.

Figure 2:
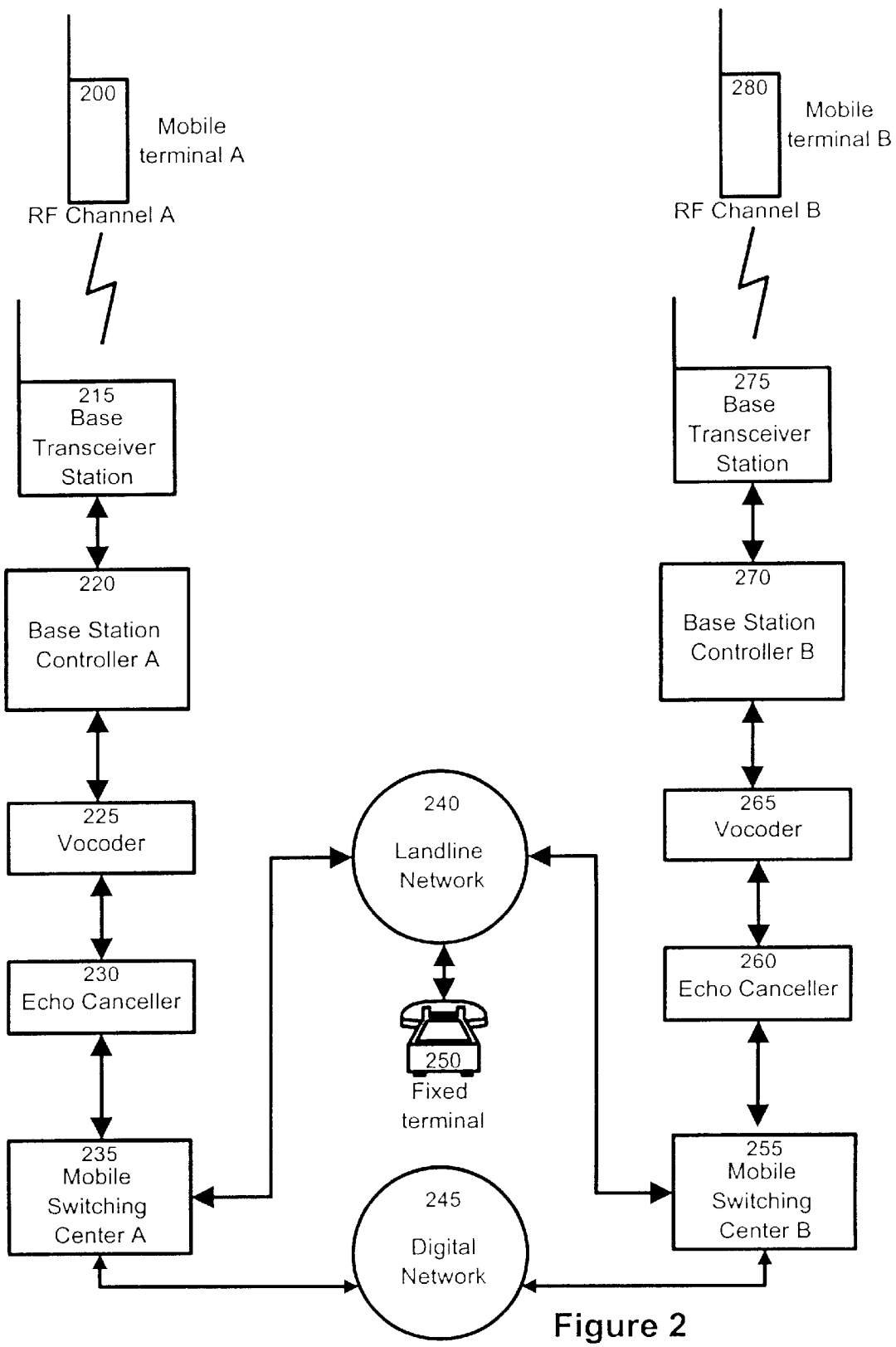
FIG. 2 is a block diagram that shows a portion of the wireless network illustrated in FIG. 1.

In existing wireless-to-wireless or wireless-to-wireline terminal communications, speech data is carried on a transport network such as depicted in FIG. 2. FIG. 2 is a block diagram that shows a part of the wireless network illustrated in FIG. 1 in more detail. The drawing illustrates an example of a telecommunication path involving wireless links and embodying vocoders. Vocoders are installed in all wireless terminals and in the fixed part of the communication network.

In wireless communications, channel bandwidth is at a premium. In order to use the smallest possible portion of a radio transmission channel, it is necessary to modulate and compress the voice signal of a user before it is transmitted. Typically, the voice signal is first digitized by means of one of many modulation techniques. Examples of these techniques are Pulse Code Modulation (PCM) and Delta Modulation, PCM being perhaps the most popular. Basically, in PCM, samples of an analog signal are taken at a specified rate (8 kHz is common) and quantized into discrete values for representation in digital format.

Encoders and decoders (codecs) are then used to compress (and decompress) the digital signals at the source and reception point, respectively, in order to optimize the use of transmission channels. Codecs used specifically for voice signals are dubbed <<voders>> (for voice coders). By encoding only the necessary characteristics of a speech signal, fewer bits need to be transmitted than what is required to reproduce the original waveform in a manner that will not significantly degrade speech quality. With fewer bits required, lower bit rate transmission can be achieved. The main advantage of compressing speech is that it uses less of the limited available channel bandwidth for transmission. The main disadvantage is some loss of speech quality.

Returning back to FIG. 2, once the RVC and FVC have been established for, say, the telecommunication link between a wireless mobile terminal (MT) A 200 and a wireline terminal (WT) 250, speech is compressed (encoded) by a vocoder located in MT A 200 and sent via a wireless link (RF channel A) and a Base Transceiver Station (BTS) 215, to Base Station Controller (BSC) A 210. It is then converted into PCM samples by the decoder of a second vocoder 225. The signal is directed, through the mobile switching center A (MSC) 235, to the landline network 240 to which WT 250 is physically connected. In the landline network, the digital signal is converted into analog format before it is routed to WT 250. In this example, speech is compressed and decompressed only once.

For a telecommunication link between two wireless mobile terminals 200 and 280 (or any two wireless terminals), proper communication channels are established as described earlier, then speech is compressed (encoded) by a vocoder located in MT A 200 and sent, via a wireless link (RF channel A) and BTS 215, to BSC A 220. It is then converted into PCM samples by the decoder of a second vocoder 225. The PCM samples are sent via MSC A 235 and the Digital Network 245 to a second MSC B 255 (if the BSCs are served by different MSC). They are compressed (encoded) a second time by the encoder of another vocoder 265. The compressed signal is then sent via BSC B 270, BTS 275 and a wireless link (RF channel B) to MT B 280 where it is decoded a second time by its vocoder. Audible speech is then available at mobile terminal 280.

In such a communications link, this arrangement of vocoders is called "tandemed vocoding". Other examples of tandemed vocoding are situations where a wireless mobile terminal is communicating with a fixed wireless terminal and when any type of wireless terminal is retrieving messages from a central voice-mail system which uses a vocoder to compress speech before it stores the data. In such cases, speech is put through the compression and decompression algorithms of vocoders more than once. When vocoders are tandemed in such a manner, the quality of speech is degraded.

Tandemed connections are not desirable particularly when low bit-rate codecs (vocoders) are used because they produce additional distortion and reduced quality of the speech signal as compared to a single stage of vocoding. To avoid this difficulty, the prior art has proposed a method called bypass that eliminates the double decoding/encoding performed by vocoders 225 and 265. More specifically, when BSC A 220 detects the destination of the message, and if the destination (BSC B 270) is bypass capable, BSC A 220 overrides the local vocoder 225 so the data stream issued by BSC A 220 is compressed speech rather than PCM samples. The data stream is transported to the BSC B 270 via the MSCs 235 and 255 and the digital network 245 as compressed speech. Similarly, BSC B 270 observes the incoming data stream and, if it notes the presence of compressed speech data blocks, overrides the local vocoder 265 in such a manner that the compressed speech samples are transmitted without any coding to MT B 280. Note that in the bypass mode, the ECs 230 and 260 are also bypassed. The structure of this system, and the signaling and command protocol required to effect by bypass operations, are described in the international patent application PCT/95CA/00704. The contents of this document are incorporated herein by reference.

The bypass solution, although effective, requires dedicated transcoders (i.e. elements that incorporates the functionality of a vocoder enhanced by a bypass branch) in each base station. This is not an optimal utilization of network resources since the vocoder functionality, or the bypass functionality of the transcoder, are alternative elements and if one is invoked during a given call, the other remains idle.

Figure 3:
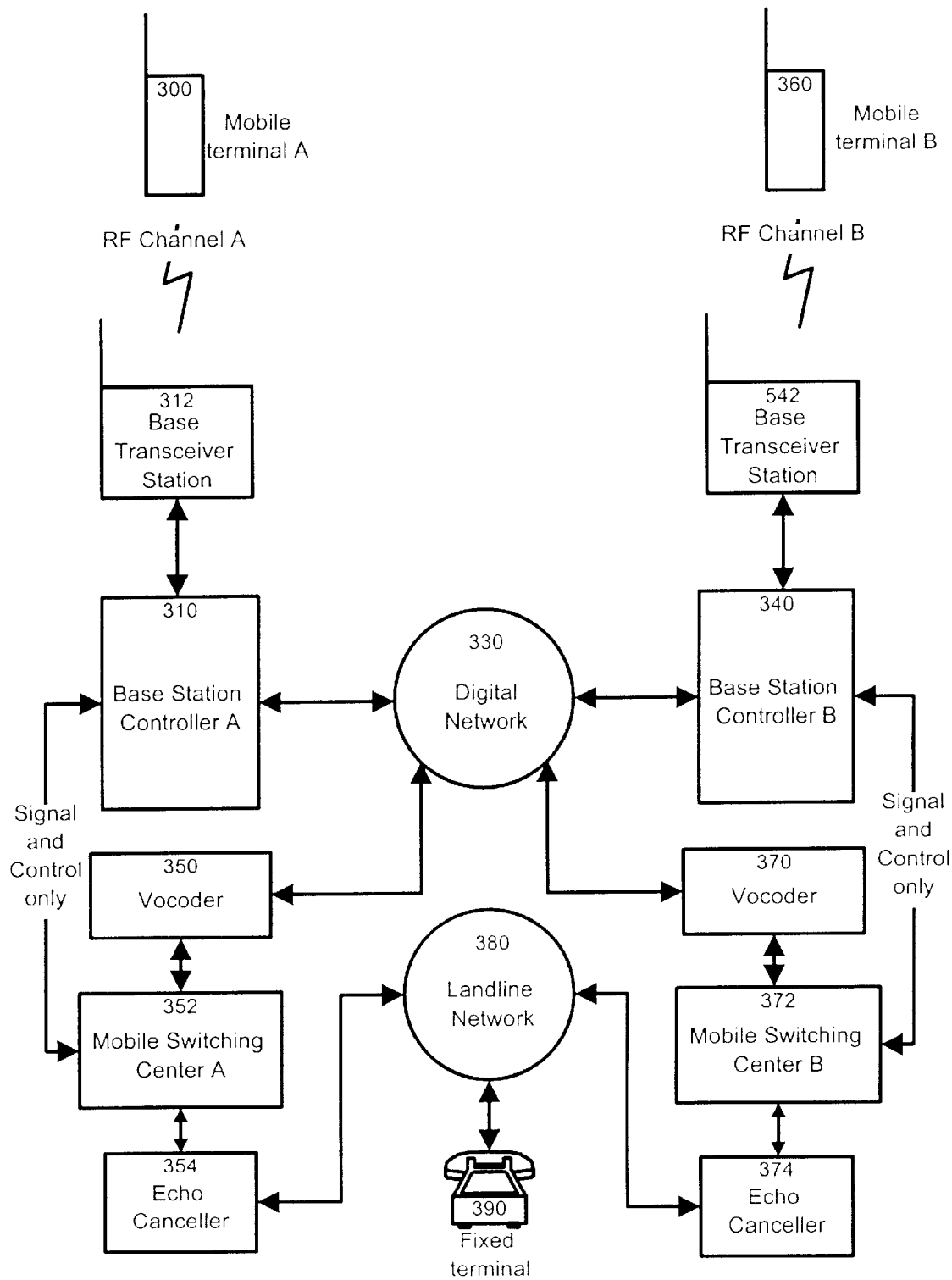
FIG. 3 is a block diagram that shows a partial representation of the wireless network in accordance with the invention.

To overcome this difficulty, the invention provides a novel wireless telecommunication system architecture for communications involving at least one wireless terminal as shown in FIG. 3. A base station controller A 310, and a base transceiver station 312, are depicted. The base station controller A 310, and the base transceiver station 312, are components whose structure and operation are well known to those skilled in the art. Thus, it is not deemed necessary to provide a complete explanation on the structure and operation of those elements in order to provide a full disclosure of the invention.

The base station controller 310 is connected to a TDM, frame relay or ATM network 330 that form the digital network (physically, the digital network may comprise any sort of medium capable of transporting signal such as cables allowing propagation of optical or electrical signals and RF links, among others) to transport the data stream toward base station controller 340 that is, generally speaking identical to the base station 310 or to a vocoder 350. Notice that the vocoder is not always part of the signal flow as it was in FIG. 2. Also note that although the base stations and vocoders depicted are respectively identical in construction, their functional elements are designated by separate reference numerals. The base station controllers are also directly connected to the Mobile Switching Centers 352 and 372 (those components are also well known to those skilled in the art and do not need to be described in detail here to provide a complete disclosure of the invention) to transfer signal and control data only. The Echo Canceller function which was previously located between the BSC and the MSC (see FIG. 2) is now located at the interface to the landline network.

In a specific example of a wireless-to-wireless call, say between mobile terminal A 300 and mobile terminal B 360, a connection is requested via the RCC and FCC then a RVC and FVC are selected for the link between the MTs and BTSs. In order to establish a channel on the link between BSC A and BSC B via the digital Network 330, known out-of-band signaling methods are used.

Once the communications channels are established, the compressed speech signal carried over the air interface is received at base station 310 via BTS 312 and processed there without effecting any transformation of the compressed speech data into PCM samples. Thus, the compressed speech data is transported over the digital trunk 330 and delivered to the base station 340, where it is processed and directed over the air interface via BTS 342 toward mobile terminal B 360. In this example, no tandem connection is created during the call since the compressed speech signal that is directed at mobile terminal A 300 passes unaltered through the network and is de-compressed only at mobile terminal B 360.

To allow wireless-to-fixed terminal calls, an RVC and FVC is established as described earlier. The network also provides a dedicated channel path through the landline network 380. In order to establish a channel on the link between BSC A and the landline network 380 via the vocoder 350 and the MSC 352, known out-of-band signaling methods are used. FIG. 3 shows examples of two identical channel paths that are both connected to the landline network 380, such as a PSTN, ISDN or the Internet network. One path comprises a vocoder 350 and a mobile switching center A 352. In the other path, the vocoder and the mobile switching center are identified by the reference numerals 370 and 372, respectively.

Once a voice channel is established, for a call between the mobile terminal A 300 and fixed terminal 390, the compressed speech signal is received at the base station controller 310 via the base transceiver station 312 and processed without effecting any decompression. This data is then passed to the digital trunk 330 that uses the established communication path to transfer the signal to the section including a vocoder. In this example, the signal will be directed to vocoder 350 MSC A 352 and EC 354, then directed through the landline network where it is transported to the fixed terminal 390. As in the situation involving a wireless-to-wireless call, the wireless-to-fixed terminal call does not involve any tandem connections.

The actual number of vocoders in the network is largely dependent upon traffic considerations. As a result of this network reconfiguration, fewer vocoders are necessary since not all wireless initiated communications need intermediate vocoders. This novel network architecture provides for a much more efficient utilization of the vocoder elements since the number of vocoders used is consistent with the actual need rather than being dependent on the number of base stations in the network. Based on statistics concerning telecommunication connections, the number of vocoders required could be calculated and their quantity in the network adjusted accordingly.

As mentioned earlier, the control system in the network dictates the path that any given data packet will follow (either through the digital network or toward the landline network) in dependence upon the packet destination. In a multiple vocoder channel arrangement, the same system can then be used to select the specific channel through which the data packet will be transported. One simple embodiment of this concept is for the control system to examine the individual channel end to direct the packet to a channel that is not currently busy with another call.

Another advantage to this network architecture is the improvement in speech quality that results from the de-coupling of the vocoder and the EC functions. Locating the EC at the interface to the landline network (as it is in the GSM network), instead of in the BSC as it is in present Time Division Multiple Access (TDMA) and Code Division Multiple Access (CDMA) networks, minimizes the duration of the EC tail-circuit and avoids the need for the EC to track time varying channels due to processing in the MSC or service circuits such as conference bridges. Operating at the landline network clock rate, the EC would avoid slips due to clock mismatches between the landline network and the ratio network.

Yet another benefit of this invention is the effect it has on flow control in wireless communications involving embedded vocoders. Consider a wireless-to-wireless call where RF channel B is in overload. In the new network configuration (with the extra vocoders out of the signal flow), the MSC, which is monitoring traffic flow in its BSCs, lets BSC B discard the extra information (FEC and others) received from MT A and reformat the speech frame before transmission to MT B.

Another possible method of flow control, when RF channel B is in overload, is achieved by using network or in-band signaling as well as radio signaling, again under the control of the MSC, to advise MT A to reduce its maximum transmission rate in order to conform to the constraints on RF Channel B. In this case, the data rate is limited by the smallest available data rate in the end-to-end connection.

The network architecture changes therefore result in better speech quality, through avoidance of tandem vocoding and better EC, in a reduction in the number of vocoders required and, finally, in better flow control over the RF channels.

The above description of a preferred embodiment should not be interpreted in any limiting manner since variations and refinements can be made without departing from the spirit of the invention. The scope of the invention is defined in the appended claims and their equivalents.

What is claimed is:

1. A communication network, comprising:

a group of base stations, each base station being operative to establish an RF communication with a wireless terminal over an air interface, each base station being capable of exchanging with a respective wireless terminal data packets of compressed audio information, each base station being free of a vocoder;

a group of vocoders for selectively encoding or decoding audio information from either one of said base stations, said group of vocoders including less vocoders than base stations in said group of base stations;

a digital network interconnecting said group of base stations and said group of vocoders, said digital network being operative to establish a first pathway to allow at least two base stations of said group of base stations to exchange data packets of compressed audio information, said pathway being free of vocoders, said digital network being further operative to establish a second pathway between a base station and a vocoder to allow a base station of said group of base stations to exchange data packets of compressed audio information with a vocoder of said group of vocoders.

2. A communication network as defined in claim 1, comprising a control system operatively connected to said digital network to control routing of data packets of compressed audio information, said control system being capable of selectively directing data packets toward a given base station.

3. A communication network as defined in claim 1, further comprising a branch connected to said digital network to establish a pathway from said digital network toward a landline network, said branch including a vocoder of said group of vocoders capable of decoding a data packet of compressed audion information directed through said branch.

4. A communication network as defined in claim 3, wherein said landline network is the PSTN.

5. A communication network as defined in claim 3, wherein said landline network is the ISDN.

6. A communication network as defined in claim 3, wherein said landline network is the Internet.

7. A communication network as defined in claim 3, wherein a vocoder of said group of vocoders comprises:

an encoder for converting a speech signal in non-compressed format to compressed format;

a decoder for converting a speech signal in compressed format to non-compressed format.

8. A communication network as defined in claim 7, wherein a vocoder of said group of vocoders includes an input for receiving a data packet of compressed audio information and an output for generating a packet of PCM samples.

9. A communication network as defined in claim 3, wherein said branch includes an echo canceller.

10. A communication network as defined in claim 3, wherein said network includes a plurality of branches, each said branch including a vocoder of said group of vocoders.

11. A communication network as defined in claim 3, wherein said control system utilizes out-of-band signaling to route the data packet of compressed audio information through either one of said digital network and said branch.

12. A communication network as defined in claim 11, wherein said branch includes a mobile switching center.

13. A communication network as defined in claim 1, wherein said digital network includes frame relays.

14. A communication network as defined in claim 1, wherein said digital network is an Asynchronous Transfer Mode network.

15. A communication network as defined in claim 1, further comprising a data communication channel including a first end and a second end, said first end being connected to said digital network, and said second end being capable of being connected to a landline network, said data communication channel comprising a certain vocoder of said group of vocoders between said first end and said second end, said certain vocoder being capable of decompressing a data packet of compressed audio information.

16. A communication network as defined in claim 15, wherein said certain vocoder is further capable of compressing a data packet of audio information that is received from the landline network.

17. A communication network as defined in claim 16, wherein said data communication channel includes an echo canceller.

* * * * *